US009246884B1

United States Patent
Pfab et al.

(10) Patent No.: US 9,246,884 B1
(45) Date of Patent: Jan. 26, 2016

(54) POSITION-BASED CRYPTOGRAPHIC KEY MANAGEMENT SYSTEM AND RELATED METHOD

(71) Applicants: Adam W. Pfab, Cedar Rapids, IA (US); Andrew J. Levake, Cedar Rapids, IA (US); Nicholas A. Barbaro, Marion, IA (US)

(72) Inventors: Adam W. Pfab, Cedar Rapids, IA (US); Andrew J. Levake, Cedar Rapids, IA (US); Nicholas A. Barbaro, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 13/830,878

(22) Filed: Mar. 14, 2013

(51) Int. Cl.
*H04L 29/06* (2006.01)
(52) U.S. Cl.
CPC .................................. *H04L 63/0428* (2013.01)
(58) Field of Classification Search
CPC .................................................... H04L 63/0428
See application file for complete search history.

(56) References Cited

U.S. PATENT DOCUMENTS

| 7,941,379 | B1 * | 5/2011 | Newstadt et al. | 705/64 |
| 2003/0099360 | A1 * | 5/2003 | Hoang | 380/277 |
| 2005/0097354 | A1 * | 5/2005 | Zurko et al. | 713/200 |
| 2007/0086593 | A1 * | 4/2007 | Denning et al. | 380/286 |
| 2014/0245007 | A1 * | 8/2014 | Buer et al. | 713/168 |

* cited by examiner

*Primary Examiner* — Saleh Najjar
*Assistant Examiner* — Oleg Korsak
(74) *Attorney, Agent, or Firm* — Angel Gerdzhikov; Donna Suchy; Daniel Barbieri

(57) ABSTRACT

A method and related system is disclosed for integrating a positioning system into the key management structure and within the information security boundary of an End Cryptographic Unit (ECU). This integration enables key management security rules written to include the ECU's trusted physical location and trusted time in determining if and with which key a message should be encrypted or decrypted. Only appropriate messages for a bounded geographic area would be decrypted and received by the ECU. The trusted positioning system allows extending functionality to allow position-enhanced authentication capabilities. Outgoing messages are cryptographically bound with the ECU's trusted position information as well as an accurate time stamp.

14 Claims, 4 Drawing Sheets

POSITION-BASED CRYPTOGRAPHIC KEY MANAGEMENT SYSTEM AND RELATED METHOD

FIELD OF THE INVENTION

The present invention relates generally to management of keys to cryptographic communication devices. More particularly, embodiments of the present invention relate to a system and method for position-based management of cryptographic keys relieving a user of manual key management as the user position changes.

BACKGROUND OF THE INVENTION

Traditionally, cryptographic key management is a manual human operation. A user of an End Cryptographic Unit (ECU) must first input a key via a fill device connected to the ECU or through a graphic user interface to the ECU. Secondly, the user must select the correct key via graphic user interface to communicate with other communications devices using the same key for accurate encryption and decryption of secure communication.

On occasion, cryptographic communications may be of critical importance during an operational event. Manual human action, subject to error, may select an inaccurate or wrongly entered key and inhibit such vital communication. Further, a specific key for communication may be reliant on a user's position where the specific position of the user determines the correct key to be used. In this case, manual human selection of an inaccurate key may inhibit successful secure communication.

Consequently, a need exists for a more automated form of cryptographic key management, including a position-based method of key management.

SUMMARY OF THE INVENTION

Accordingly, an embodiment of the present invention is directed to a method for position-based cryptographic key management, the method comprises associating a cryptographic module within an information security boundary with a positioning system within the information security boundary, the cryptographic module having a cryptographic engine and a list of security rules, the positioning system configured for reception of at least a positioning signal and a timing signal, receiving and storing a plurality of cryptographic keys, associating at least one of the plurality of cryptographic keys with a known position to create a first security rule, associating at least one of the plurality of cryptographic keys with a known time window to create a second security rule, receiving a positioning signal and a time signal via the positioning system, determining a trusted position and a trusted time based on the positioning signal, determining: if the trusted position is in proximity with the known position, and if the trusted time is within the known time window, applying at least one of: the first security rule and the second security rule as an appropriate security rule, and the associated at least one of the plurality of cryptographic keys based on the determining, and encrypting and decrypting communication via the cryptographic module based on the applied security rule and the at least one associated plurality of cryptographic keys.

Embodiments of the present invention provide for a cryptographic module further configured for encrypting and decrypting secure communication and an information security boundary further configured as a perimeter within which all information is trusted.

Additional embodiments of the present invention provide a positioning system further configured for receiving positioning signals and determining a position based on the received signals and the known position includes a bounded geographical area defined on each side by a border.

Additional embodiments of the present invention provide an appropriate security rule comprising at least one security rule from the list of security rules and encrypting and decrypting communication via the cryptographic module comprises an encryption preceding a communication transmission and a decryption following a communication reception.

Additional embodiments of the present invention provide a system for position-based cryptographic key management, the system comprising an end cryptographic unit, the end cryptographic unit having an information security boundary, a cryptographic module within the information security boundary of the end cryptographic unit, the cryptographic module including a cryptographic engine and a list of security rules, a positioning system within the information security boundary of the end cryptographic unit, the positioning system configured for receiving and decoding a plurality of positioning signals and a plurality of timing signals, a key fill device configured for loading a plurality of keys, the cryptographic engine configured for storing the plurality of keys, a transmitter/receiver, the transmitter/receiver configured for sending and receiving signals to and from the cryptographic engine and an offboard ECU, wherein the cryptographic module is configured for: receiving a positioning input from the positioning system, receiving a timing input from the positioning system, receiving and storing a plurality of keys from the key fill device, determining a security rule appropriate for use from the list of security rules based on the positioning input, the timing input and at least one key of the plurality of keys, encrypting and decrypting a communication between a user and the transmitter/receiver based on the security rule appropriate for use.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
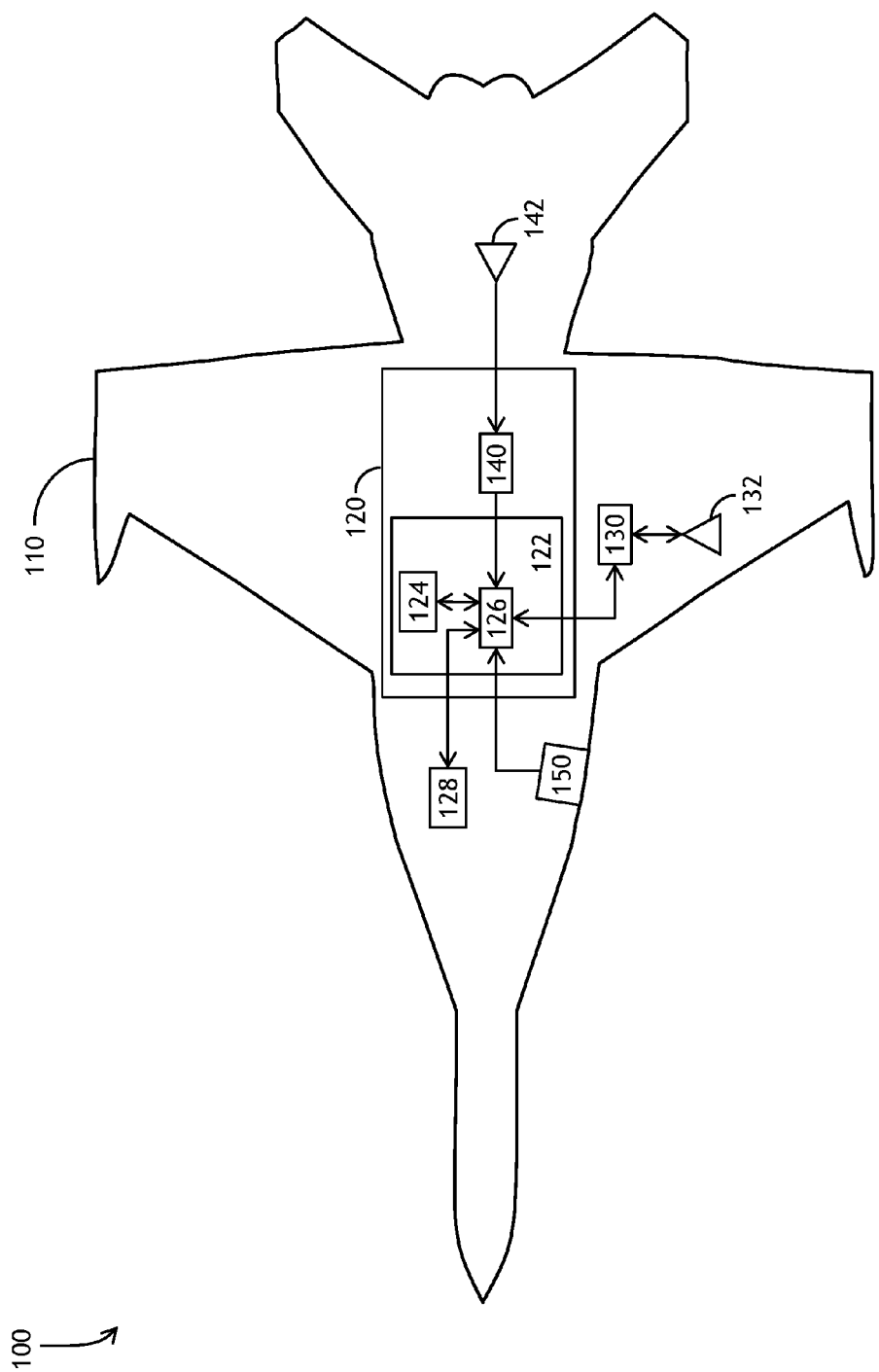
FIG. 1 is an overview an exemplary physical layer of an embodiment of the present invention.

Reference will now be made in detail to the presently preferred embodiments of the invention, examples of which are illustrated in the accompanying drawings.

The following description presents certain specific embodiments of the present invention. However, the present invention may be embodied in a multitude of different ways as defined and covered by the claims. In this description, reference is made to the drawings wherein like parts are designated with like numerals throughout.

Embodiments of the present invention provide for a method for position-based management for cryptographic keys. More specifically, embodiments herein provide for a trusted position input as one of the inputs within an information security boundary of a cryptographic communications system.

Platforms within which embodiments of the present invention may operate may vary. One embodiment of the present invention may operate on an aircraft whereas an additional embodiment may function in an ECU as mounted on a tracked vehicle. One embodiment may function as incorporated within a radio configured for a human on foot. An airborne embodiment as exemplarily used herein serves not to limit the scope of the invention to a fighter sized aircraft but offer one example of the present invention. It is contemplated herein embodiments of the present invention may function within a variety of platforms, on a plurality of radios usable by a plurality of moving entities.

Embodiments of the present invention may employ a plurality of security rules to determine which key to use for encryption and decryption of communication information. For example, a time coupled with a key or a position coupled with a key are one example of a security rule. A cryptographic engine acting under commands of the present invention may make key selection decisions based on one or more security rules.

Embodiments of the present invention provide a system and method for auto-key selection based on time and location. A set of keys may expire at a specific time where if an expired key were manually selected, cryptographic communication would not be possible. Embodiments herein further provide for position-based automatic key selection where the cryptographic module performs auto key selection based on user position.

Additionally, embodiments of the present provide for loading a plurality of keys which may cover a plurality of known time windows and a plurality of geographical regions. For example, a time based key may be in operation from 1401Z to 1500Z another time based key may become operational from 1501Z to 1600Z. Keys may be loaded to the ECU to cover as much time as needed by the operator. Additionally, a position key may cover an area based on latitude and longitude or other geographic reference. A defined geographic area may require a first key whereas an adjacent defined geographic area may require a second key. As time progresses and the user of the ECU may traverse from the defined geographic area to the adjacent defined geographic area, embodiments of the present invention select and place into operation the required key for the defined geographic area.

Referring to FIG. 1, an overview an exemplary physical layer of an embodiment of the present invention is shown. Aircraft 110 may act as the desired platform upon which embodiments of the present invention may be mounted and employed. System 100 comprises, within information security boundary 120, trusted elements of an ECU. One trusted element is cryptographic module 122 which houses security rules 124 and a cryptographic engine 126. Additionally, positioning system 140 also lies within the information security boundary 120. Outside information security boundary 120 are key fill device 150, transmitter/receiver 130 with associated antenna 132, user 128 and positioning system receiver antenna 142.

Positioning System 140 may receive signals from a plurality of positioning systems usable by embodiments of the present invention. For example, reception of a ground based signal, an airborne based positioning signal, and a satellite based positioning signal may function within the scope of the present invention. Additionally, a combination of the above signals may enable system 100 to operate within the scope of this disclosure. It is contemplated herein; embodiments of the present invention may employ a variety of positioning systems receiving a plurality of positioning signals. For example, a Global Positioning System (GPS) signal and a Global Navigation Satellite System (GNSS) signal may be examples of satellite based signals usable by embodiments of the present invention.

Also, an onboard positioning systems may fall within the scope of the present invention. For example, system 100 may use an onboard inertial positioning system configured for embodiments of the present invention.

In addition, a time signal may be received and usable by embodiments of the present invention. A ground based, airborne based and satellite based timing signal may accompany the positioning signal or be a stand-alone timing signal. It is contemplated herein; system 100 may function with the accuracy of the received time signal to incorporate the received time signal within one or more of the security rules 124. This time signal incorporation within the information security boundary 120 may, for example, assist embodiments of the present invention to aid in replay attack prevention.

Security rules 124 may function as the rules within which cryptographic engine 126 must operate. For example, as cryptographic engine 126 determines which key to employ in a geographic area, cryptographic engine 126 consults security rules 124 to determine which key or set of keys to use.

Cryptographic engine 126 operates as the encryption and decryption device to allow encrypted communication between user 128 and a second user via transmitter/receiver 130. Cryptographic engine 126 receives trusted inputs from the sources and determines which of the security rules 124 to use for encrypted communication.

Transmitter/receiver 130 may function as a well-known transceiver, sending and receiving signals to additional transceivers within range. For example, user 128 may transmit a signal intending for the signal to be encrypted. Cryptographic engine 126 receives the signal and consults with security rules to determine the proper security rule to use for the user position and the time. Cryptographic engine 126 then encrypts the signal and transmits the encrypted signal to transmitter/receiver 130 for transmission via antenna 132.

Embodiments of the present invention place the positioning system 140 within the information security boundary 120 of the ECU. Once within the information security boundary 120, a trusted positioning system 140 may enable the ECU to autonomously alternate between required keys based on position. A user 128 may operate hands off conducting encrypted communication without being required to manually select a specific time-based or position-based key.

The trusted positioning and timing source within the information security boundary 120 allows additional function of the cryptographic engine 126 within an ECU. One additional function an embodiment of the present invention may provide is an enhancement to message authentication. A trusted time/ position may augment the message's authenticity, proving that the sender is where they claim to be when the message is sent, in addition to their identity. Authentication methods make use of various data integrity functions, such as hashing, and the trusted time/position may contribute additional content to the authentication method usable within the scope of method 100.

Embodiments of the present invention may leverage the time space position of the ECU (and platform thereon) to ensure trusted communication. For example, a specific platform may be in one position at a first time. The same platform may be at a second position at a second time. The trusted positioning and time reference within the information security boundary enables embodiments of the present invention trusted status with respect to other ECUs within the network. For example an operation radio may be configured with embodiments of the present invention to enable position-based security rules. An exemplary Single Channel Ground and Airborne Radio System (SINCGARS) radio may be configured with one embodiment of the present invention to enable position based security rules.

Figure 2:
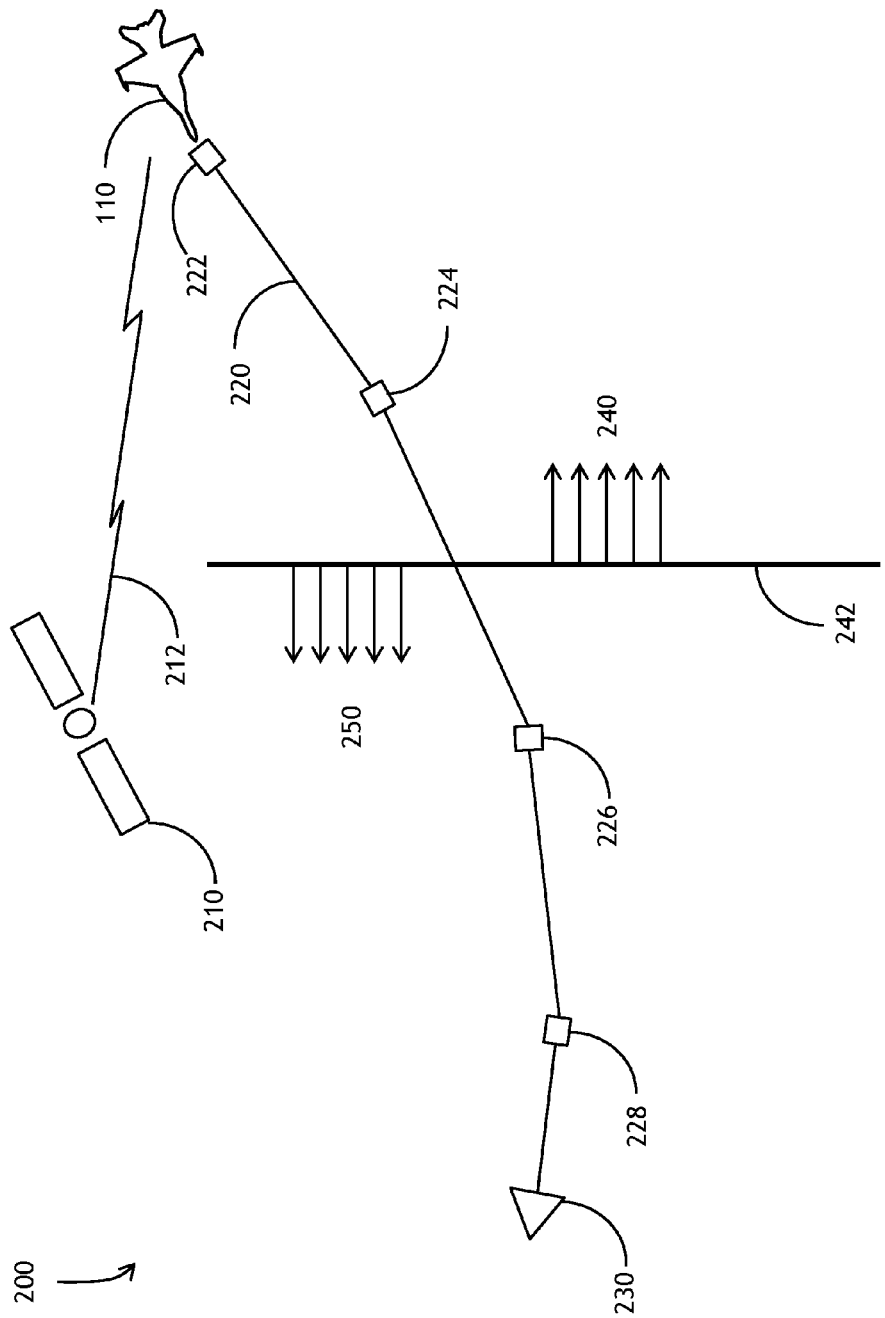
FIG. 2 is a diagram of multiple networks requiring a keyed cryptographic communications device exemplary of an embodiment of the present invention.

Referring to FIG. 2, diagram of multiple networks requiring a keyed cryptographic communications device exemplary of an embodiment of the present invention is shown. Aircraft 110 may follow path 220 along points 222, 224, 226, and 228 en route to destination 230. Satellite 210 provides positioning and timing signals 212 receivable by positioning system 140 onboard aircraft 110. Along the route 220, aircraft 110 may encounter a first network 240 within which secure communications may be desired. Further along route 220, aircraft 110 may encounter second network 250 within which secure communications may be desired. A border 242 indicates the break between where aircraft 110 may communicate with first network and where aircraft 110 may communicate with second network 250.

Embodiments of the present invention provide for a position-based input to the ECU onboard aircraft 110 to allow autonomous key selection and appropriate security rules 124 use. As aircraft 110 is within first network 240, system 100 selects an appropriate key selection and security rule 124 for use. While aircraft 110 is within second network 250, system 100 selects another appropriate security rule 124 and key for secure communication.

Figure 3:
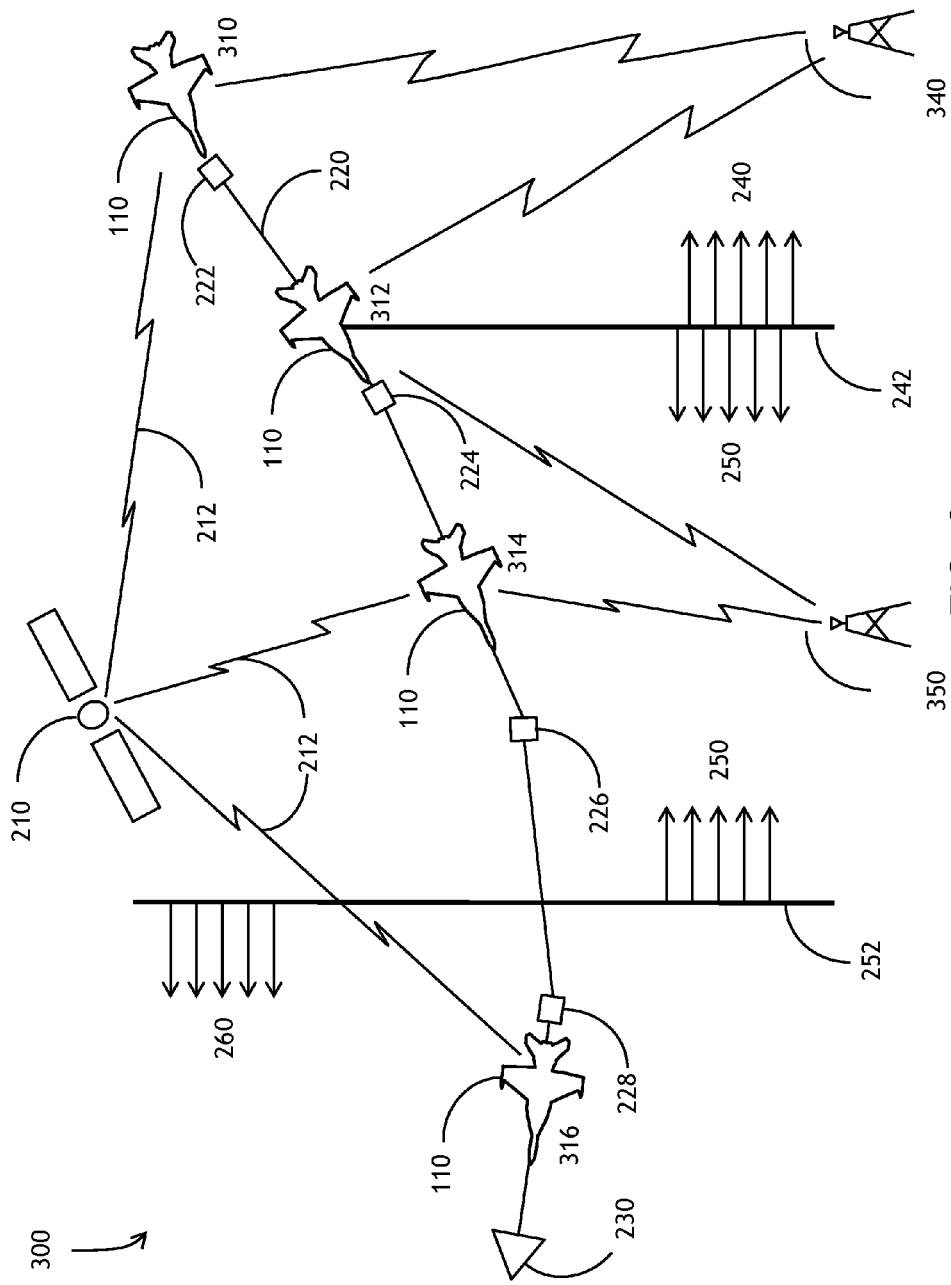
FIG. 3 is a diagram of multiple ground based networks requiring a keyed cryptographic communications device exemplary of an embodiment of the present invention.

Referring to FIG. 3, diagram of multiple ground based networks requiring a keyed cryptographic communications device exemplary of an embodiment of the present invention is shown. Aircraft 110 may traverse first network 240, second network 250 and a third area 260 while en route between point 222 and destination 230. Within first network 240, ground station 340 may be a node to which aircraft 110 may desire encrypted communication. Similarly, within second network 250, ground station 350 may desire secure communication with aircraft 110.

With aircraft 110 in position 310, a first key is required to securely communicate in first network 240 with ground station 340. At position 312, aircraft may communicate in first network 240 with ground station 340 via the first key and also communicate in second network 250 with ground station 350 via a second key. In position 314, aircraft 110 may communicate in network 250 only with ground station 350 via the second key. In position 316, no ground stations are available for aircraft 110 to communicate with so a third key for communication in third network 260 may be appropriate.

Embodiments of the present invention may automatically select the appropriate key and associated appropriate security rule at each position based on trusted positioning system 140. The trusted positioning system 140 accurately determines position and time based on reception and process of satellite based signals 212. While aircraft 110 moves between networks, system 100 selects the appropriate key, the appropriate security rule and automatically enables position-based cryptic communication for the operator 128.

Further, system 100 selects the appropriate key and appropriate security rule 124 based on the trusted time input from the positioning system 140.

Additionally, system 100 stores keys for future use. For example, once aircraft 110 traverses path 220 to destination 230, aircraft 110 may be required to egress along path 220 to point 222. System 100 maintains a plurality of keys and is able to select the appropriate key and security rule for each network along the egress path. Further, system 100 may enable an operator 128 store a sufficient number of keys to cover a number of days of operations. Theater and local rules dependent, a supervisor or commander may authorize storage of an unlimited number of keys within a memory associated with cryptographic engine 126.

Embodiments of the present invention may provide a variety of applications based on trusted positioning information and trusted time information. One such application may include an ECU maneuvering between Continental US and Outside the Continental US or between Strategic and Tactical environments. The ECU in these situations would assure that only properly structured keys would be used to encrypt/decrypt. The integration of the positioning data into the ECU information security boundary may leverage the high assurance of an embeddable cryptographic engine requiring high-assurance cryptographic processing.

Further, a multichannel, programmable cryptographic engine providing Multiple Independent Levels of Security (MILS) may benefit from inclusion of system 100 trusted positioning information within the information security boundary.

Figure 4:
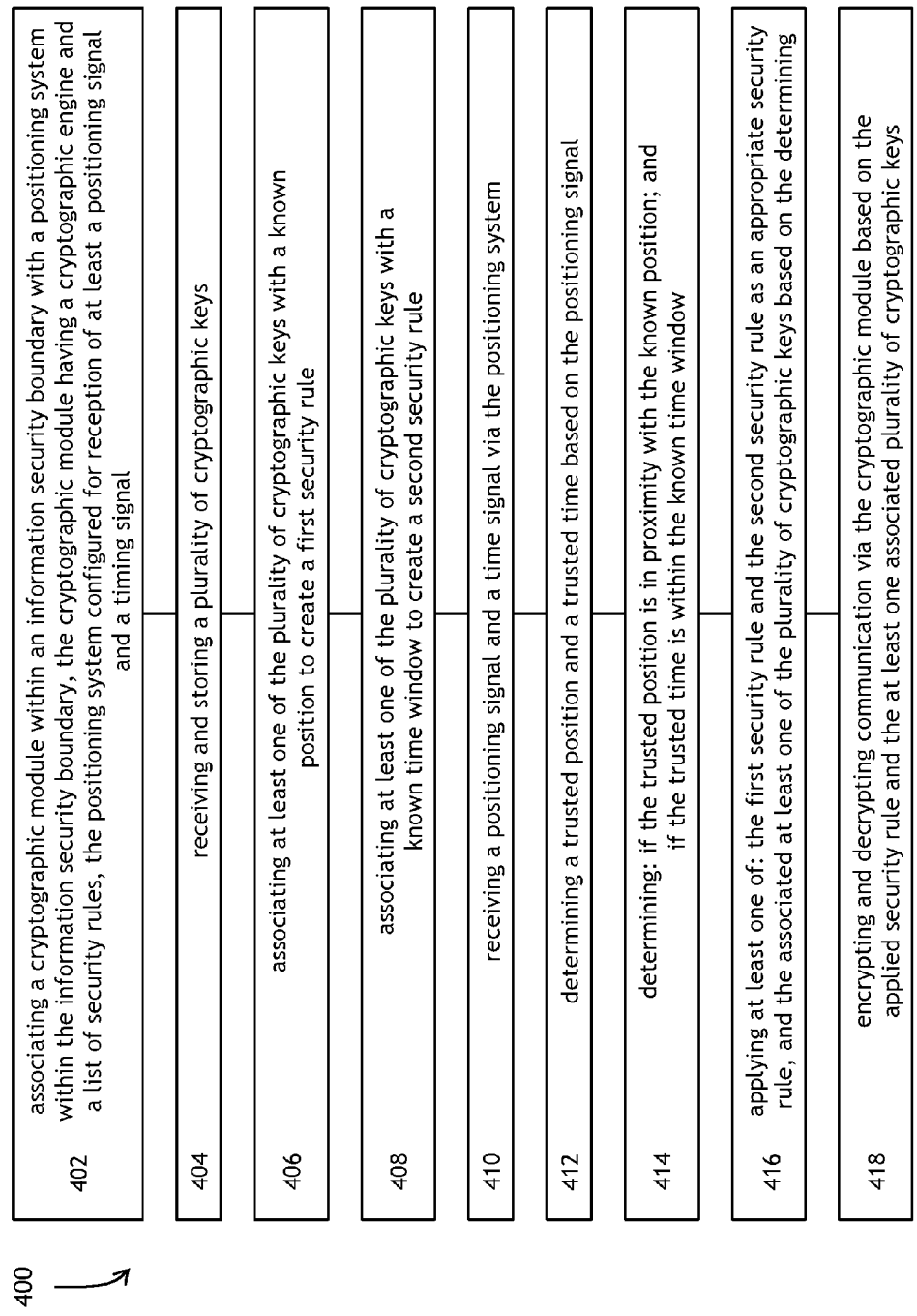
FIG. 4 is a flow diagram of a method for position-based cryptographic key management representative of an embodiment of the present invention.

Referring to FIG. 4, a flow diagram of a method for position-based cryptographic key management representative of an embodiment of the present invention is shown. Method 400 begins at step 402 with associating a cryptographic module within an information security boundary with a positioning system within the information security boundary, the cryptographic module having a cryptographic engine and a list of security rules, the positioning system configured for reception of at least a positioning signal and a timing signal, and at step 404, receiving and storing a plurality of cryptographic keys, and at step 406, associating at least one of the plurality of cryptographic keys with a known position to create a first security rule, and at step 408, associating at least one of the plurality of cryptographic keys with a known time window to create a second security rule. Method 400 continues at step 410, receiving a positioning signal and a time signal via the positioning system, and at step 412, determining a trusted position and a trusted time based on the positioning signal, and at step 414, determining: if the trusted position is in proximity with the known position; and if the trusted time is within the known time window, and at step 416, applying at least one of: the first security rule and the second security rule as an appropriate security rule, and the associated at least one of the plurality of cryptographic keys based on the determining, and finally at step 418, encrypting and decrypting communication via the cryptographic module based on the applied security rule and the at least one associated plurality of cryptographic keys.

CONCLUSION

Specific blocks, sections, devices, functions, processes and modules may have been set forth. However, a skilled technologist will realize that there are many ways to partition the system, and that there are many parts, components, processes, modules or functions that may be substituted for those listed above.

While the above detailed description has shown, described and pointed out the fundamental novel features of the invention as applied to various embodiments, it will be understood that various omissions and substitutions and changes in the form and details of the system illustrated may be made by those skilled in the art, without departing from the intent of the invention. The foregoing description details certain embodiments of the invention. It will be appreciated, however, that no matter how detailed the foregoing appears, the invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method for position-based cryptographic key management onboard a moving entity, comprising:
    associating a cryptographic module onboard the moving entity with a positioning system onboard the moving entity, each of the cryptographic module and the positioning system within a physical information security boundary onboard the moving entity, the physical information security boundary a physical perimeter onboard the moving entity within which all information is trusted, the cryptographic module having a cryptographic engine and a list of security rules, the positioning system configured for reception of at least a positioning signal and a timing signal;
    receiving, via a key fill device onboard the moving entity, and storing a plurality of cryptographic keys via the cryptographic module onboard the moving entity;
    associating at least one of the plurality of cryptographic keys with a known position to create a first security rule;
    associating at least one of the plurality of cryptographic keys with a known time window to create a second security rule;
    receiving a positioning signal and a time signal via the positioning system;
    determining a trusted position and a trusted time based on the positioning signal;
    determining:
        if the trusted position is in proximity with the known position; and
        if the trusted time is within the known time window;
    applying at least one of: the first security rule and the second security rule as an appropriate security rule, and the associated at least one of the plurality of cryptographic keys based on the determining; and
    encrypting and decrypting communication via the cryptographic module onboard the moving entity based on the applied security rule and the at least one associated plurality of cryptographic keys, the communication including an encryption preceding a communication transmission and a decryption following a communication reception.

2. The method for position-based cryptographic key management of claim 1, wherein the cryptographic module onboard the moving entity is further configured for encrypting and decrypting secure communication.

3. The method for position-based cryptographic key management of claim 1, wherein the positioning system is further configured for receiving positioning signals and determining a position based on the received signals.

4. The method for position-based cryptographic key management of claim 1, wherein the known position further comprises a bounded geographical area defined on each side by a border.

5. The method for position-based cryptographic key management of claim 1, wherein the appropriate security rule further comprises at least one security rule from the list of security rules.

6. A system for position-based cryptographic key management onboard a moving entity, comprising:
    an end cryptographic unit onboard the moving entity, the end cryptographic unit having a physical information security boundary, the physical information security boundary a physical perimeter onboard the moving entity within which all information is trusted;
    a cryptographic module onboard the moving entity within the physical information security boundary of the end cryptographic unit, the cryptographic module onboard the moving entity including a cryptographic engine and a list of security rules;
    a positioning system within the physical information security boundary of the end cryptographic unit, the positioning system configured for receiving and decoding a plurality of positioning signals and a plurality of timing signals;
    a key fill device configured for loading a plurality of keys, the cryptographic engine configured for storing the plurality of keys;
    a transmitter/receiver, the transmitter/receiver configured for sending and receiving signals to and from the cryptographic engine and an offboard ECU;
    wherein the cryptographic module onboard the moving entity is configured for:
        receiving a positioning input from the positioning system;
        receiving a timing input from the positioning system;
        receiving and storing a plurality of keys from the key fill device;
        determining a security rule appropriate for use from the list of security rules based on the positioning input, the timing input and at least one key of the plurality of keys;
        encrypting and decrypting a communication between a user and the transmitter/receiver based on the security rule appropriate for use, the communication including an encryption preceding a communication transmission and a decryption following a communication reception.

7. The system for position-based cryptographic key management of claim 6, wherein the cryptographic module onboard the moving entity is further configured for encrypting and decrypting secure communication.

8. The system for position-based cryptographic key management of claim 6, wherein the positioning system is further configured for receiving positioning signals and determining a position based on the received signals.

9. The system for position-based cryptographic key management of claim 6, wherein the known position further comprises a bounded geographical area defined on each side by a border.

10. The system for position-based cryptographic key management of claim 6, wherein the appropriate security rule further comprises at least one security rule from the list of security rules.

11. A non-transitory computer readable medium having computer readable program code embodied therein for position-based cryptographic key management onboard a moving entity, the computer readable program code comprising instructions which, when executed by a computer device or processor, perform and direct the steps of:

associating a cryptographic module onboard the moving entity with a positioning system onboard the moving entity, each of the cryptographic module and the positioning system within a physical information security boundary onboard the moving entity, the physical information security boundary a physical perimeter onboard the moving entity within which all information is trusted, the cryptographic module having a cryptographic engine and a list of security rules, the positioning system configured for reception of at least a positioning signal and a timing signal;

receiving, via a key fill device onboard the moving entity, and storing a plurality of cryptographic keys via the cryptographic module onboard the moving entity;

associating at least one of the plurality of cryptographic keys with a known position to create a first security rule;

associating at least one of the plurality of cryptographic keys with a known time window to create a second security rule;

receiving a positioning signal and a time signal via the positioning system;

determining a trusted position and a trusted time based on the positioning signal;

determining:
    if the trusted position is in proximity with the known position; and
    if the trusted time is within the known time window;

applying at least one of: the first security rule and the second security rule as an appropriate security rule, and the associated at least one of the plurality of cryptographic keys based on the determining; and encrypting and decrypting communication via the cryptographic module onboard the moving entity based on the applied security rule and the at least one associated plurality of cryptographic keys, the communication including an encryption preceding a communication transmission and a decryption following a communication reception.

12. The non-transitory computer readable medium of claim 11, wherein the cryptographic module onboard the moving entity is further configured for encrypting and decrypting secure communication.

13. The non-transitory computer readable medium of claim 11, wherein the positioning system is further configured for receiving positioning signals and determining a position based on the received signals.

14. The non-transitory computer readable medium of claim 11, wherein the known position further comprises a bounded geographical area defined on each side by a border.

* * * * *